United States Patent
Van Den Bogaert et al.

(10) Patent No.: US 7,916,639 B2
(45) Date of Patent: Mar. 29, 2011

(54) METHOD FOR DATA-FLOW QUALITY CONTROL, A RELATED RECEIVER AND A RELATED TRANSMITTER

(75) Inventors: Etienne André Hubert Van Den Bogaert, Schaarbeek (BE); Jan Sylvia Verlinden, Wommelgem (BE)

(73) Assignee: Alcatel Lucent, Paris (FR)

( * ) Notice: Subject to any disclaimer, the term of this patent is extended or adjusted under 35 U.S.C. 154(b) by 1007 days.

(21) Appl. No.: 11/197,490

(22) Filed: Aug. 5, 2005

(65) Prior Publication Data

US 2006/0028873 A1 Feb. 9, 2006

(30) Foreign Application Priority Data

Aug. 6, 2004 (EP) .................................. 04292004

(51) Int. Cl.
*H04L 1/00* (2006.01)
(52) U.S. Cl. ........ 370/235; 370/252; 370/485; 375/222; 375/260
(58) Field of Classification Search .................. 370/260, 370/222, 235, 236–236.2; 365/185; 375/260, 375/222
See application file for complete search history.

(56) References Cited

U.S. PATENT DOCUMENTS

| | | | |
|---|---|---|---|
| 5,903,608 A * | 5/1999 | Chun | 375/260 |
| 6,459,678 B1 | 10/2002 | Herzberg | |
| 2003/0112884 A1 * | 6/2003 | Tzannes | 375/260 |
| 2003/0130824 A1 * | 7/2003 | Antoine et al. | 702/189 |
| 2004/0057528 A1 * | 3/2004 | Tzannes | 375/260 |
| 2005/0213405 A1 * | 9/2005 | Stopler | 365/203 |

FOREIGN PATENT DOCUMENTS

| | | | |
|---|---|---|---|
| WO | WO 02/17584 | * | 2/2002 |
| WO | WO 02/17584 A2 | | 2/2002 |
| WO | WO 02/089436 A1 | | 11/2002 |

OTHER PUBLICATIONS

Series G: Transmission Systems and Media Digital Systems and Networks Digital Transmission Systems—Digital Sections and Digital Lie System—Access Networks Splitterless Asymmetric Digital Subscriber Line (ADSL) Transceivers, ITU-T Recommendation G.992.2, Oct. 13, 2000, pp. 1-11, XP002149968.

Series G: Transmission Systems and Media, Digital Systems and Networks Digital transmission systems—Digital sections and digital line system—Access networks—Asymmetric digital subscriber line (ADSL) transceivers.

* cited by examiner

*Primary Examiner* — Derrick W Ferris
*Assistant Examiner* — Jose Villa
(74) *Attorney, Agent, or Firm* — Harness, Dickey & Pierce, P.L.C.

(57) ABSTRACT

The present invention relates to a method for data-flow quality control in a Digital Subscriber Line communications system comprising a transmitter, a receiver, and a Digital Subscriber Line intercoupling the transmitter and the receiver. The transmitter sends a data-flow to the receiver, where the data-flow is modulated onto data-carriers according to a bit allocation indicative for the number of bits to be modulated on each data-carrier. The method comprises the steps of the receiver measuring the data-flow quality and subsequently the receiver instructs the transmitter to decrease the bit allocation with a same amount for a plurality of data-carriers in case the data-flow quality is unsatisfactorily low. Then the transmitter decreases the bit allocation accordingly.

7 Claims, 2 Drawing Sheets

METHOD FOR DATA-FLOW QUALITY CONTROL, A RELATED RECEIVER AND A RELATED TRANSMITTER

CROSS REFERENCE TO RELATED APPLICATIONS

This application claims priority under 35 USC §119 to European Patent Application 04292004.1, filed on Aug. 6, 2004, in the European Patent Office (EPO), the disclosure of which is incorporated herein in its entirety by reference.

BACKGROUND OF THE INVENTION

1. Field of the Invention

The present invention relates to a method for data-flow quality control in a Digital Subscriber Line communications system as described in the preamble of claim 1, the related receiver as described in the preamble of claim 4 and the related transmitter as described in the preamble of claim 5.

2. Description of the Related Art

Such a method and related devices are already known in the art, e.g. from the section "AOC on-line adaptation and reconfiguration", pages 119-123 of ITU-T Recommendation G.992.1 with title "*Asymmetric digital subscriber line (ADSL) transceivers*" published in June 1999 by the International Telecommunications Union (ITU).

Therein, it is described that the transmit power in a Digital Subscriber Line system, called an ADSL-system, is distributed over all data-carriers, called sub-carriers, resulting in a certain Power Spectral Density (PSD) value for each carrier. This transmit power is attenuated by the travelling along the channel and results in a certain, reduced, receive power at the receiver. Moreover, the channel also has the characteristic to add noise to the signal. From this attenuated signal together with the added noise a Signal to Noise Ratio can be determined. Based on this Signal to Noise Ratio, the number of bits that can be transmitted on each carrier while still guaranteeing a certain maximum error-rate can be determined. This number of bits then is transmitted on each data carrier by the transmitter once the transmitter is in showtime.

As the channel characteristic due to certain conditions, such as new upcoming disturbers or weather conditions and noise changes in time, the Signal to Noise Ratio of the signal changes also. Hence, due to the changing channel characteristics and noise, the current Signal to Noise Ratio may differ from the Signal to Noise Ratio that is required to transmit the previously determined number of bits per carrier while still guaranteeing a certain data-flow quality for instance a certain maximum error-rate. In order to retune the Power Spectral Density value for each carrier to a new value that fits to the changed current channel characteristics and noise on the channel without interrupting the data-flow, to guarantee a stable communication, a bit swap is performed.

Because of the fact that in ADSL version 1 as described in the above mentioned ITU-T Recommendation G.992.1, the bit swap mechanism is only able to change at most 4 (normal bit swap request) or 6 (extended bit swap request) tones every second, the modem can go out of showtime before having the time to perform all the necessary bit swaps if the noise conditions on the line are changing rapidly.

Furthermore, in ADSL version 2 as described in ITU-T Recommendation G.992.2 the bit swap mechanism is bigger and may include all carriers in the bit swap, which constitutes an improvement compared to the ADSL version 1. In this case however, the bit swap request message to be transferred is large and if the noise on the line is high, the probability that the received bit swap request message is corrupt is still considerably present.

BRIEF SUMMARY OF THE INVENTION

An object of the present invention is to provide a data-flow quality control method, a transmitter and a receiver of the above known type for data-signal quality control but wherein the data-flow quality control is executed in such way that the stability of the modem increases significantly.

According to the invention, this object is achieved by the data-flow control method as described in claim 1, the receiver as described in claim 2 and the transmitter as described in claim 3.

Indeed, by requesting the transmitter, in case the data flow quality of the data-flow received by the receiver is unsatisfactorily low, to improve the data flow quality by decreasing the bit allocation with a same amount for a plurality of data-carriers and by subsequently in response to the requesting of the receiver, the transmitter decreasing the bit allocation accordingly the data-flow quality is improved.

The data flow quality may be "unsatisfactorily low" if the signal-to-noise ratio for all data-carriers or for set of data-carriers is to low, if the noise for any or for all data-carriers is too high, if an error rate is too high (at Bit level: Forward error correcting codes can report if many bits are to be corrected or if uncorrectable errors are present at; at Frame level: Cyclic redundancy check (CRC) errors on data-path level Cell level: ATM cells CRC errors detected; at Packet level: TCP CRC errors; at Application level: video decoding errors, voice delay) or if a certain dataflow quality between a digital subscriber line operator and corresponding customer or user is unsatisfactorily low according to a pre-agreed contract. Hence by decreasing the number of bits carried on the carriers with a same amount for all data-carriers of the plurality of data-carriers, the bit-rate is adapted in a quick way, without using any calculating or reallocation mechanism as applied in the bit swap, so that the noise margin over each of the data carriers of the plurality of data-carriers is now sufficiently high for guaranteeing a stable modem behaviour while carrying a reduced number of bits per carrier. In this way the noise margin improves to such an extent and within a very short time that the modem-stability increases significantly and that the transmission of data can be executed with a significant lower probability of corrupt frames compared to the existing bit swap-method. A very short time to increase the stability is due to the fact that for each carrier of the plurality of carriers the same action is to be performed without requiring calculations to determine the action for each carrier.

Moreover due to the fact that for the plurality of carriers the decrease of bit allocation is done with a single amount, the request message is significant smaller than the bit swap-message leading to a higher probability of successful transmission of this message.

Furthermore in our invention the overall bitrate is decreased by the bit allocation decrease without compensating this decrease by increasing the bit allocation for other data-carriers. No reallocation is performed in our present invention.

An additional characteristic feature of the present invention is described in claim 2.

The same amount for decreasing the allocation for all carriers of the plurality of carriers is a predetermined amount.

An additional characteristic feature of the present invention is described in claim 3.

The same amount for decreasing said bit allocation for all carriers of the plurality of carriers is determined based on the dataflow quality.

An additional characteristic feature of the present invention is described in claim 6.

By executing a bit swap on data-carriers for transporting a data-flow from the transmitter to the receiver after the decreasing of the bit allocation for a plurality of data-carriers, this bit swap is executed for fine-tuning the power spectral density resulting from the direct bit number decrease.

An additional characteristic feature of the present invention is described in claim 7.

The data-flow quality is a signal-to-noise ratio.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein:

Figure 1:
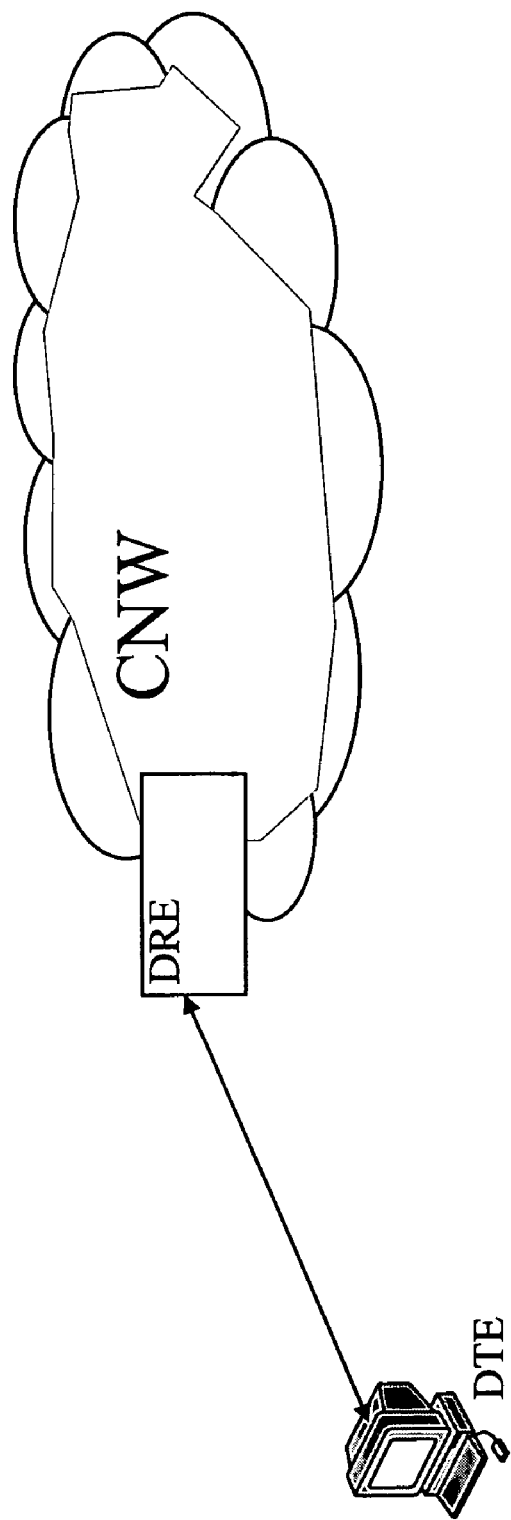
FIG. 1 represents a Digital Subscriber line communications system.
Figure 2:
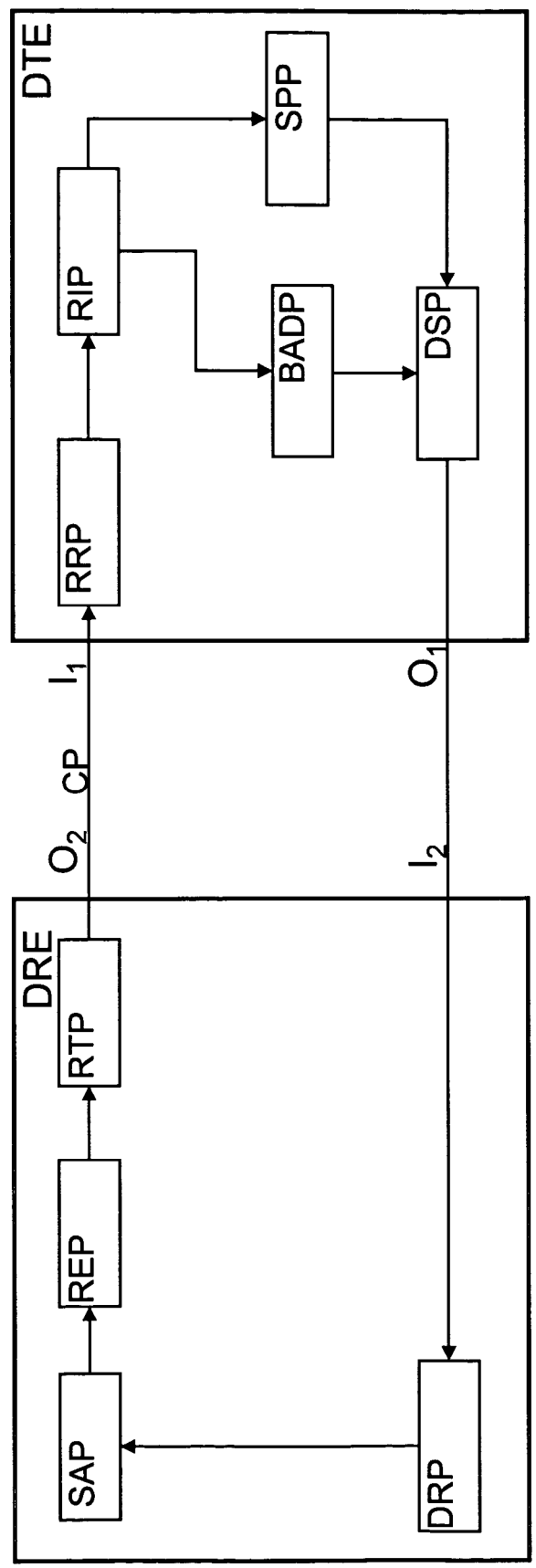
FIG. 2 represents the functional representation of the transmitter DTE and the receiver DRE as presented in FIG. 1.

In the following paragraphs, referring to the drawings, an implementation of the data-flow quality control method, a transmitter and a receiver according to the present invention will be described. In the first paragraph of this description the main elements of the Digital Subscriber Line system as presented in FIG. 1 are described. In the second paragraph, all connections between the before mentioned elements and described means are defined. Subsequently all relevant functional means of the transmitter and receiver as presented in FIG. 2 are described followed by a description of all interconnections. In the succeeding paragraph the actual execution of the data flow quality control method is described.

DETAILED DESCRIPTION OF THE INVENTION

The essential elements of the Digital Subscriber Line communications system network of the embodiment according to the present invention are a transmitter, in this embodiment chosen to be a user terminal and a receiver here chosen to be a central office coupling the transmitter to a communications network CNW which here is chosen to be the Internet. The transmitter is able to send data towards the receiver by modulating this data on a plurality of carriers according any of the Digital Subscriber Line standards, further referred to as DSL, such as the Asymmetric Digital Subscriber Line (ADSL) and the very high bit-rate Digital Subscriber Line (VDSL) standards.

In order to keep simplicity in this description it is chosen to only describe one transmitter DTE and one receiver DRE although such a Digital Subscriber Line communications network usually comprises a plurality of transmitters and receivers.

The transmitter DTE is coupled over a copper twisted pair, e.g. the commonly known POTS network to the receiver DRE.

The receiver DRE first comprises a data receiving part DRP that is adapted to receive a data-flow transmitted by a DSL transmitter DTE where this data-flow said data-flow being modulated onto data carriers according to a bit allocation indicative for the number of bits to be modulated on each data-carrier. This modulation may be according to any of the DSL standards. The signal analysis part SAP that is able to analyse the quality of the received data-flow that is transmitted by the transmitter DTE. The receiver DRE further comprises a Request Establishing part REP that is adapted to formulate a request for the transmitter DTE to improve the quality of the data-flow in case the quality of the data-signal is unsatisfactorily low, i.e. the signal-to-noise ratio beneath a predefined level, the increase of the noise level or even a larger amount of FEC-errors, frame CRC errors, ATM CRC errors, TCP CRC errors or application errors. In the present invention this Request Establishing part REP is adapted to formulate the request to improve the quality of the data-signal by decreasing the bit allocation for a plurality of data-carriers. The Request transmitting part RTP, that affer formulating the request by the Request Establishing part REP is adapted to forward this request towards the transmitter DTE.

The Request Establishing part REP is coupled with an input to an output of the signal analysis part SAP. The signal analysis part SAP is coupled with an input to an output of the Data receiving part DRP. The Request transmitting part RTP in its turn is coupled with an input to an output of the Request Establishing part REP and further has an output that is at the same time an output-terminal $O_2$ of the receiver DRE. The Data receiving part DRP has an input that is at the same time an input-terminal $I_2$ of the receiver DRE.

The transmitter DTE first comprises a data sending part DSP that is adapted to send a data flow towards an DSL receiver where this data flow is modulated onto data carriers according to a bit allocation indicative for the number of bits to be modulated on each data-carrier. This modulation may be according any of the DSL standards, and further comprises a request reception part RRP that is adapted to receive from the receiver DRE a request to improve the quality of the data-flow. Additionally the transmitter DTE comprises a request interpreting part RIP that is able to interpret the request to improve the quality of the data-flow and determine which action is to be executed. The transmitter DTE further comprises a bit allocation decreasing part BADP that is able to decrease the bit allocation for a plurality of the data carriers in response to a request to improve the quality of a data-flow. The transmitter DTE may additionally comprise a bit swap performing part SPP that is able to perform a bit swap on data-carriers for transporting a data-flow from the transmitter to the receiver DRE affer the direct decrease of said number of bits carried by a plurality of the data-carriers.

The data sending part DSP has an output that is at the same time an output-terminal $O_1$ of the transmitter DTE and has an input that is coupled to an output of the direct bit decreasing part DBDP. The data sending part DSP further has an input that is coupled to an output of the bit swap performing part SPP. The request interpreting part RIP is coupled with an input to an output of said request reception part RRP. The request reception part RRP has an input that is at the same time an input-terminal $I_1$ of the transmitter DTE. The bit allocation decreasing part BADP further is coupled with an input to an output of the request interpreting part RIP.

The additional bit swap performing part SPP is coupled with an input to an output of the request interpreting part RIP.

In order to explain the present invention it is assumed that due to the additional noise and external conditions, such as an upcoming new disturber, the Signal-to-Noise Ratio has decreased to such an extent that an improvement of the quality of the data-signal, is necessary in order to guarantee that the error-rate of the data-transmission remains beneath a certain predetermined maximum level. Due to this decreased Signal-to-Noise ratio the noise margin is reduced which in turn leads to a higher error rate.

Alternatively the unsatisfactorily low quality may be that the signal-to-noise ratio for all data-carriers or for set of data-carriers is too low, the noise for any or for all data-carriers is too high, if an error rate is too high (at Bit level: Forward error correcting codes can report if many bits are to be corrected or if uncorrectable errors are present at Frame level: Cyclic redundancy check (CRC) errors on data-path level Cell level: ATM cells CRC errors detected; at Packet level: TCP CRC errors; at Application level: video decoding errors, voice delay) or if a certain dataflow quality between a digital subscriber line operator and corresponding customer or user is unsatisfactorily low according to a pre-agreed contract.

The signal analysis part SAP of the receiver DRE analyses the quality of the received data-flow that is transmitted by said transmitter DIE. This analysis may be done for instance by measuring a signal-to-noise ratio once per time interval. In case the quality of the data-signal is beneath a predefined level, i.e. a quality-level where beneath a maximum error rate in the data-transmission is not guaranteed, due to the resulting too small noise margin, the Request Establishing part REP will formulate a request for said transmitter to improve the data-flow in case the quality of the data-flow is unsatisfactorily low, i.e. the signal-to-noise ratio for all data-carriers or the signal-to-noise ratio of a set of data-carriers is beneath a predefined level. In the present invention this Request Establishing part REP will formulate the request to improve the quality of the data-signal by decreasing the bit allocation with a same number for a plurality of the data-carriers. The Request transmitting part RTP, after formulating the request by the Request Establishing part REP then transmits this request towards the transmitter DTE over the control path CP. The request reception part RRP receives the request to improve the quality of the data-flow from the receiver DRE. The interpreting part RIP subsequently will interpret the request to improve the quality of the data-flow and determine which action is to be executed. The bit allocation decreasing part BADP then decreases the bit allocation with this same number for this plurality of the data carriers in response to the request to improve the quality of the data-flow.

This same amount for decreasing the allocation for all carriers of the plurality of carriers is for instance a predetermined amount or, alternatively, this same amount for decreasing the bit allocation for all carriers of the plurality of carriers is determined based on the dataflow quality as determined.

This direct bit number decrease improves the noise margin to such an extent and within a very short time that the modem-stability increases significantly and that the transmission of data can be executed with a significant lower probability of corrupt frames compared to the existing bit swap-method.

Then in order to fine-tune the data-signal with an overall direct bit number decrease, the bit swap performing part SPP performs after the direct bit number decrease a bit swap on the carriers for transporting a data-signal from said transmitter DTE to said receiver DRE.

It is to be noted that the bit allocation decrease over the plurality of the data-carriers may be a bit allocation decrease over all the data-carriers in order to realise a noise margin improvement over the entire spectrum of the signal, however this also may be a transmit power increase over a subset of data-carriers, where the subset consists of more than one data carrier, in order to improve the signal ratio improvement over a predetermined part of the entire spectrum of the signal.

Bit swap messages are sent from receiver to transmitter to adapt the bit loading and/or the transmit energy of the carriers to the changing line conditions.

The DSL receiver may further comprise a bit swap initiating part SIP that is adapted to formulate, based on criteria such as the Signal-to Noise Ratio, a request to perform a bit swap on carriers for transporting a data-signal from the transmitter DTE to the receiver DRE and the DSL receiver additionally comprises a bit swap request transmitting part STP that is adapted to transmit a request to perform a bit swap on carriers for transporting a data-signal from the transmitter DTE to the receiver DRE.

It is further also to be noted that although only one direction of data transmission is described together with the mechanism of the present invention for that direction, the present invention is also applicable for data transmission in the other direction.

Furthermore it is to be noted that in our invention the overall bitrate is decreased by the bit allocation decrease without compensating this decrease by increasing the bit allocation for other data-carriers. No reallocation is performed in our present invention. A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. Method for data-flow quality control in a Digital Subscriber Line communications system including a transmitter, a receiver, and a Digital Subscriber Line intercoupling said transmitter and said receiver, said transmitter sending a data-flow to said receiver, said data-flow being modulated onto data-carriers according to a bit allocation indicative for the number of bits to be modulated on each data-carrier, said method comprising:
measuring, at the receiver, the data-flow quality,
transmitting a single request message to the transmitter, by the receiver, to decrease the bit allocation by a same amount for a plurality of data-carriers in case said data-flow quality is unsatisfactorily low, the request message is only a single value, the single value representing the amount by which to decrease the bit allocation; and
decreasing, at the transmitter, said bit allocation accordingly.

2. Method for data-flow quality control according to claim 1, wherein the same amount for decreasing said bit allocation for said plurality of carriers is a predetermined amount.

3. Method for data-flow quality control according to claim 1, wherein the same amount for decreasing said bit allocation for said plurality of carriers is determined based on said dataflow quality.

4. Receiver for use in a Digital Subscriber Line communications system including a transmitter, said receiver and a Digital Subscriber Line intercoupling said transmitter and said receiver, said receiver being configured to receive a data-flow transmitted by said transmitter, said data-flow being modulated onto data-carriers according to a bit allocation indicative for the number of bits to be modulated on each data-carrier, said receiver comprising:
- a signal analysis part, configured to measure a data-flow quality; a request establishing part, having an input coupled to an output of said signal analysis part and configured to formulate a single request for said transmitter to improve said data-flow quality in case said data-flow quality is unsatisfactorily low;
- a request transmitting part, having an input coupled to an output of said request establishing part and configured to forward said request towards said transmitter,
- wherein the request establishing part of said receiver is configured to formulate said single request to improve said data-flow quality by decreasing said bit allocation by a same amount for a plurality of data-carriers, the request is only a single value, the single value representing the amount by which to decrease the bit allocation.

5. Receiver according to claim 4, wherein said data-flow quality is a signal-to-noise ratio.

6. Transmitter for use in a Digital Subscriber Line communications system including said transmitter, a receiver and a Digital Subscriber Line intercoupling said transmitter and said receiver, said transmitter being able to send a data-flow to said receiver, said data-flow being modulated onto data-carriers according to a bit allocation indicative for the number of bits to be modulated on each data-carrier, said transmitter comprising:
- a request reception part, configured to receive from said receiver a request to improve a data flow quality;
- a request interpreting part, coupled with an input to an output of said request reception part and configured to interpret said request to improve said data-flow quality, wherein said transmitter further comprises:
- a bit allocation decreasing part, coupled with an input to an output of said request interpreting part and configured to decrease said bit allocation by a same amount for a plurality of data-carriers based on the request, the request is only a single value, the single value representing the amount by which to decrease the bit allocation.

7. Transmitter according to claim 6, wherein said transmitter further comprises a bit swap performing part, coupled with an input to an output of said request interpreting part and configured to perform a bit swap on said data-carriers for continuing to transport said data-flow from said transmitter to said receiver after said decrease of said bit allocation.

\* \* \* \* \*